Jan. 16, 1962     J. R. JACK ETAL     3,016,693
ELECTRO-THERMAL ROCKET
Filed Sept. 23, 1960
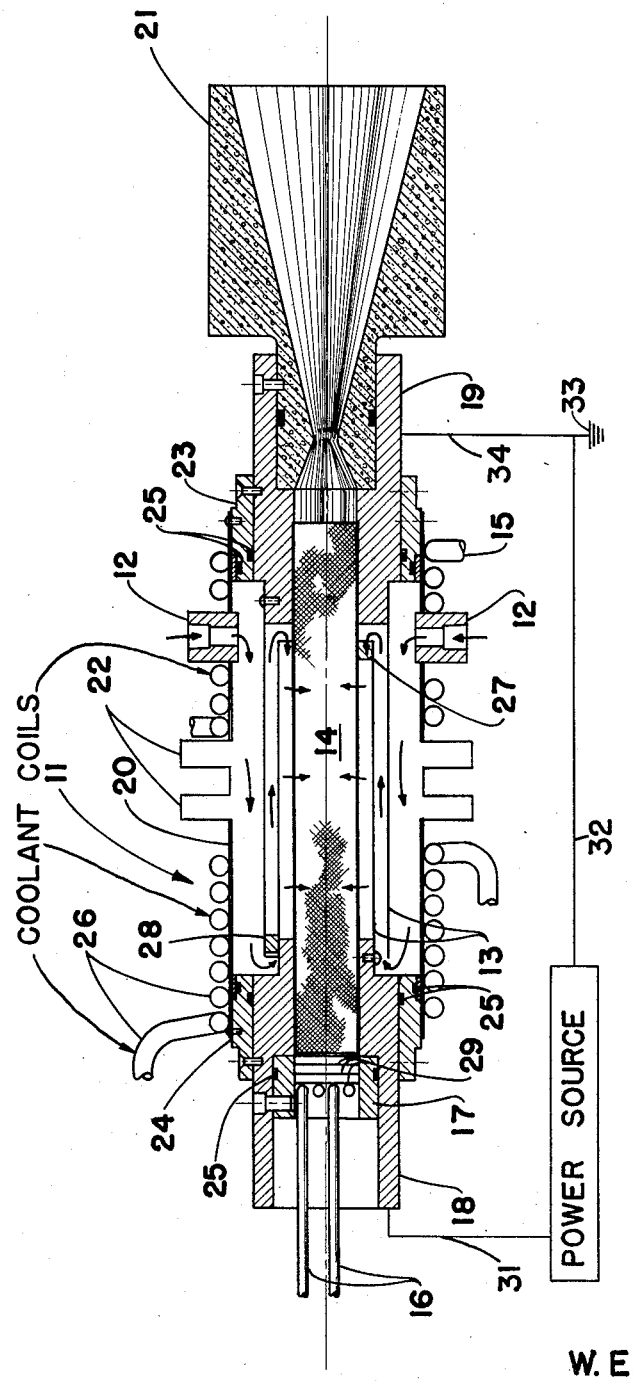
INVENTORS
J. R. JACK
W. E. MOECKEL
BY
ATTORNEY

United States Patent Office 3,016,693
Patented Jan. 16, 1962

3,016,693
ELECTRO-THERMAL ROCKET
John R. Jack, North Olmsted, and Wolfgang E. Moeckel, Bay Village, Ohio, assignors to the United States of America as represented by the Administrator of the National Aeronautics and Space Administration
Filed Sept. 23, 1960, Ser. No. 58,147
6 Claims. (Cl. 60—35.5)
(Granted under Title 35, U.S. Code (1952), sec. 266)

The invention described herein may be manufactured and used by or for the Government of the United States of America for governmental purposes without the payment of any royalties thereon or therefor.

This invention pertains to an electro thermal rocket employing an electrically-powered resistance heated heat exchanger.

Analysis of space missions has indicated that a large increase in payload may be achieved by using an electrical propulsion system instead of the conventional chemical system. For missions in the gravitational field of the earth and moon, the optimum specific impulse for an electric propulsion device ranges from approximately 1500 to 5000 seconds. Adequate payloads may be handled for certain satellite missions with specific impulses ranging from 800 to 1500 seconds. An electric propulsion device that operates well over the lower half of this specific impulse range—that is 800 to 2000 seconds—is the thermal arc jet or plasma jet. It is particularly desired that an electric rocket be capable of operating for 60 days or longer with the required thrust and impulse. The arc jet, as well as the instant rocket, heats the propellant to a very high temperature and then expands it in a convergent-divergent nozzle. Propulsion is thus obtained by a thermal dynamic process. However, the arc jet has several severe penalties associated with it when operating times of the order of 60 days are considered.

A disadvantage associated with the use of the electric arc rocket is that there is extreme electrode erosion when the rocket is used for any period of time approaching 60 days or even much less. There is additionally the disadvantage in that there is an extreme problem in the arc voltage regulation and difficulties are involved in the arc starting.

A further disadvantage is that there is heat transfer to the engine. In fact it appears to be beyond existing technology to develop an arc jet rocket without expecting major breakdowns in its operation for the required time.

In the present invention the propellant is admitted to the rocket chamber and passes through an electrically-powered resistance heated heat exchanger to bring the propellant up to the temperature required for ejection through a conventional convergent-divergent nozzle at very high velocity. To develop the required thrust the hydrogen must be heated to approximately 5500° R. This temperature can be handled by present-day refractory materials such as carbon, tantalum, and tungsten. The herein disclosed space engine is particularly designed for approximately one pound of thrust and a specific impulse in the region of 1000 seconds. Such a propulsion device would be useful for altitude control or as the final stage engine for a communication satellite mission.

Thus, an object of this invention is to provide a novel electro-thermal rocket.

Another object of this invention is to provide a propulsion device utilizing an electrically-powered resistance heated heat exchanger.

An additional object of this invention is to provide an electro-thermal rocket engine that is capable of operating for extended periods without major breakdown.

A further object of this invention is to provide a device which produces a propulsive jet through the heating of propellant during passage through or around electrically-heated essentially solid surfaces.

Other objects and many attendant advantages of the present invention will be apparent from the following detailed description when taken together with the accompanying drawing in which:

The single drawing is a partially-sectioned pictorial view of an electro-thermal rocket engine using an electrically-powered resistance heated porous tungsten heat exchanger.

Referring now to the drawing, there is shown the rocket engine 11 having a cylindrical outer casing or shell 20 of nickel construction or any other material having approximately the same emissivity as nickel. The outer casing 20 is provided with metal bellows 22 to permit a heat exchanger 14 to expand axially without buckling. Two sleeves 23 and 24 are disposed at opposite ends and within the casing 20. The two sleeves 23 and 24 are principally of boron nitride construction or any high temperature electrical insulating material. Mounted concentrically within the sleeves 23 and 24 are two electrical connectors 18 and 19. The connector 18 mounted within the sleeve 24 at the front end of the engine is a positive electrical connection while the connector 19 mounted within the sleeve 23 at the rear end of the engine is a negative electrical connection. The electrical connectors 18 and 19 are of molybdenum construction or any suitable refractory metal. The electric power can be furnished by a nuclear turboelectric system as indicated in the figure by the box defined as a power source. The connector 18 receives its energy through the electrical connections 31 attached to the power source. The power source is additionally connected by electrical connection 32 to ground 33, while the connector 19 is connected to the ground 33 by the electrical connection 34. Situated concentrically within and supported by the two electrical connectors 18 and 19 is the annular porous tungsten heat exchanger 14. The heat exchanger 14 can be of "Poroloy" made by Bendix Filter Division of Bendix Aviation Corporation, which is made by winding fine, flattened wire into tubular shapes. At the front end of the heat exchanger 14 are three radiation shields 29 to prevent heat leakage. The shields are preferably of tungsten construction and are supported by a ring member 17 situated within the electrical connector 18. Coolant coils 16 are provided to direct coolant to the face of the radiation shield 29. At the rear end of the heat exchanger 14 is situated the convergent divergent nozzle 21 which, in this embodiment, is of graphite for test purposes mainly. In an actual space flight application, the nozzle would probably be constructed of a refractory material that does not react with hydrogen. High temperature O-ring seals 25 are used throughout the rocket engine to prevent any leakage of the propellant between the various parts of the engine. Coolant coils 15 and 26 surround the outer casing 20 and serve to cool the engine. Water can be used as the coolant in this experimental prototype. Of course, in actual space application a regenerative type of coolant system would be used whereby the propellant acts as the coolant and cools the nozzle, as well as the outer casing before entering the heat exchanger.

In operation of the engine the propellant, which is hydrogen, is admitted through the inlets 12 and passes and flows in a direction as indicated by the arrow heads between the radiation shields 13 which are made of tungsten and then on through the walls of the electrically-powered resistance heated porous tungsten heat exchanger 14 whereby the hydrogen is raised to a temperature of approximately 5500° R. and is then exhausted through the nozzle 21. The radiation shields 13 serve to prevent heat leakage from the heat exchanger and are separated from one another by support means 27 and 28, as shown in the figure. By having the electrical connections in contact with the walls of the heat exchanger 14, it becomes a resistance to the electrical current and the material is raised to an exceedingly high temperature so that when the hydrogen passes through the porous walls it is raised to the desired approximately 5500° R. and, of course, expands upon being heated to such a temperature, forcing its way out through the convergent-divergent nozzle 21. Although the particular embodiment shown utilizes a porous heat exchanger, it should not be concluded that this is the only type possible. Any engine employing an electrically-powered resistance heated heat exchanger is suitable. Thus, many heat exchanger designs utilizing this feature are feasible for the present invention. As an example, a staggered tube heat exchanger using refractory wire filaments is an alternative embodiment of this invention. Thus, this invention embraces all electro-thermal space engines which utilize the principle of heating the propellant during passage through or around electrically-heated solid surfaces.

Obviously, many modifications and variations of the present invention are possible in the light of the above teachings. It is, therefore, to be understood that within the scope of the appended claims the invention may be practiced other than as specifically described.

What is claimed:

1. An electro thermal rocket engine comprising an outer shell, an annular porous metal heat exchanger situated within said shell, electrical connections operably associated with the opposite ends of said heat exchanger whereby an electrical current may be caused to pass through said heat exchanger, propellant inlet means operably associated with said outer shell for admitting propellant to said heat exchanger whereby the propellant admitted passes through and is heated by said porous heat exchanger, and a convergent-divergent exhaust nozzle rigidly attached to said outer shell.

2. The rocket engine of claim 1 wherein said annular porous metal heat exchanger is an annulus of porous tungsten.

3. An electro thermal rocket engine comprising an outer cylindrical shell, an annular porous tungsten heat exchanger mounted concentrically within said outer shell, cylindrical radiation shields situated between said outer shell and said heat exchanger, propellant inlet means attached to said outer shell for admitting hydrogen propellant to said heat exchanger whereby the hydrogen propellant flows around said radiation shields and then through said porous heat exchanger, and a convergent-divergent exhaust nozzle rigidly attached to said outer shell.

4. The porous tungsten heat exchanger of claim 3 which is an annulus of wound flattened tungsten wire.

5. An electro thermal rocket engine comprising: an outer cylindrical shell; an annular porous metal heat exchanger mounted within said outer shell; electrical connection means operably coupled to opposite ends of said heat exchanger whereby an electrical current may be caused to pass through said heat exchanger; cylindrical radiation shields positioned within said outer shell between said heat exchanger and said shell; propellant inlet means attached to said outer shell for admitting propellant to said heat exchanger whereby the propellant admitted flows around said radiation shields and through said porous heat exchanger; means surrounding said outer shell to provide passage for a coolant to cool said shell; a convergent-divergent exhaust nozzle rigidly attached to said outer shell.

6. The engine set forth in claim 5 wherein said outer shell is provided with bellow means to permit axial expansion thereof.

References Cited in the file of this patent

UNITED STATES PATENTS

| 1,687,550 | Ehret | Oct. 16, 1928 |
| 2,837,623 | Judson | June 3, 1958 |

FOREIGN PATENTS

| 20,697 | Great Britain | Sept. 17, 1907 |